United States Patent
Sun et al.

(10) Patent No.: US 12,317,283 B2
(45) Date of Patent: May 27, 2025

(54) SCHEDULING OF CONTROL SIGNALING ON A PRIMARY CELL BY A SECONDARY CELL

(71) Applicant: Apple Inc., Cupertino, CA (US)

(72) Inventors: Haitong Sun, Cupertino, CA (US); Chunxuan Ye, San Diego, CA (US); Dawei Zhang, Saratoga, CA (US); Hong He, San Jose, CA (US); Huaning Niu, San Jose, CA (US); Seyed Ali Akbar Fakoorian, San Diego, CA (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 305 days.

(21) Appl. No.: 17/818,512

(22) Filed: Aug. 9, 2022

(65) Prior Publication Data

US 2023/0039290 A1 Feb. 9, 2023

Related U.S. Application Data

(63) Continuation of application No. 17/593,726, filed as application No. PCT/CN2021/110558 on Aug. 4, 2021, now Pat. No. 12,058,701.

(51) Int. Cl.
| | |
|---|---|
| *H04W 72/12* | (2023.01) |
| *H04L 5/00* | (2006.01) |
| *H04W 16/14* | (2009.01) |
| *H04W 72/1263* | (2023.01) |
| *H04W 72/23* | (2023.01) |
| *H04W 72/232* | (2023.01) |

(52) U.S. Cl.
CPC ............ *H04W 72/23* (2023.01); *H04L 5/0053* (2013.01); *H04W 16/14* (2013.01); *H04W 72/1263* (2013.01); *H04W 72/232* (2023.01)

(58) Field of Classification Search
CPC .............................. H04W 16/14; H04W 72/23
USPC ......................................................... 370/329
See application file for complete search history.

(56) References Cited

U.S. PATENT DOCUMENTS

| | | | |
|---|---|---|---|
| 2021/0045147 A1 | 2/2021 | Zhou et al. | |
| 2022/0264555 A1* | 8/2022 | Liu ................... | H04W 72/0453 |
| 2023/0144688 A1* | 5/2023 | Duan ................... | H04L 5/0035 370/311 |

(Continued)

FOREIGN PATENT DOCUMENTS

| | | |
|---|---|---|
| EP | 3716698 | 9/2020 |
| WO | 2020/067806 | 4/2020 |

*Primary Examiner* — Robert J Lopata
(74) *Attorney, Agent, or Firm* — Fay Kaplun & Marcin, LLP

(57) ABSTRACT

A base station of a network configures a first search space having a first search space identification (SearchSpaceId) in a special cell (SpCell) and a second search space having a second search space identification (SearchSpaceId) in a secondary cell (SCell) for monitoring control signaling that schedules operations on the SpCell. The base station transmits a radio resource control (RRC) configuration to a user equipment (UE) including the first SSID and the second SSID, wherein the RRC configuration configures the UE to monitor the first search space having the first SSID for scheduling of a first type of control signaling and the second search space having the second SSID for scheduling of a second type of control signaling.

18 Claims, 4 Drawing Sheets

(56) References Cited

U.S. PATENT DOCUMENTS

| | | | |
|---|---|---|---|
| 2023/0284205 A1* | 9/2023 | Nory | H04L 5/001 |
| | | | 370/329 |
| 2023/0362943 A1* | 11/2023 | Sun | H04W 72/23 |
| 2024/0064762 A1* | 2/2024 | Sun | H04L 1/0038 |
| 2024/0195549 A1* | 6/2024 | Han | H04L 5/0053 |
| 2024/0215011 A1* | 6/2024 | Cheng | H04B 17/328 |

* cited by examiner

SCHEDULING OF CONTROL SIGNALING ON A PRIMARY CELL BY A SECONDARY CELL

BACKGROUND

When establishing the network connection such as, for example, a connection to a 5G new radio (NR) network, a next generation NodeB (gNB) transmits downlink channel information (DCI) to the UE via a physical downlink control channel (PDCCH). The PDCCH is transmitted to the UE via one or more control resource sets (CORESETS). Because 5G new radio (NR) spectrum is difficult to obtain and expensive, operators have utilized dynamic spectrum sharing (DSS) so that 5G NR and long term evolution (LTE) transmissions can coexist in the same spectrum. However, transmissions of the CORESETS for 5G communications may interfere with cell reference signals (CRS) transmissions on the LTE network.

SUMMARY

Some exemplary embodiments are related to a processor of a base station configured to perform operations. The operations include configuring a first search space having a first search space identification (SearchSpaceId) in a special cell (SpCell) and a second search space having a second search space identification (SearchSpaceId) in a secondary cell (SCell) for monitoring control signaling that schedules operations on the SpCell and transmitting a radio resource control (RRC) configuration to a user equipment (UE) including the first SSID and the second SSID, wherein the RRC configuration configures the UE to monitor the first search space having the first SSID for scheduling of a first type of control signaling and the second search space having the second SSID for scheduling of a second type of control signaling.

Other exemplary embodiments are related to a base station having a transceiver configured to communicate with a user equipment (UE) and a processor communicatively coupled to the transceiver and configured to perform operations. The operations include configuring a first search space having a first search space identification (SearchSpaceId) in a special cell (SpCell) and a second search space having a second search space identification (SearchSpaceId) in a secondary cell (SCell) for monitoring control signaling that schedules operations on the SpCell and transmitting a radio resource control (RRC) configuration to the UE including the first SSID and the second SSID, wherein the RRC configuration configures the UE to monitor the first search space having the first SSID for scheduling of a first type of control signaling and the second search space having the second SSID for scheduling of a second type of control signaling.

DETAILED DESCRIPTION

Figure 1:
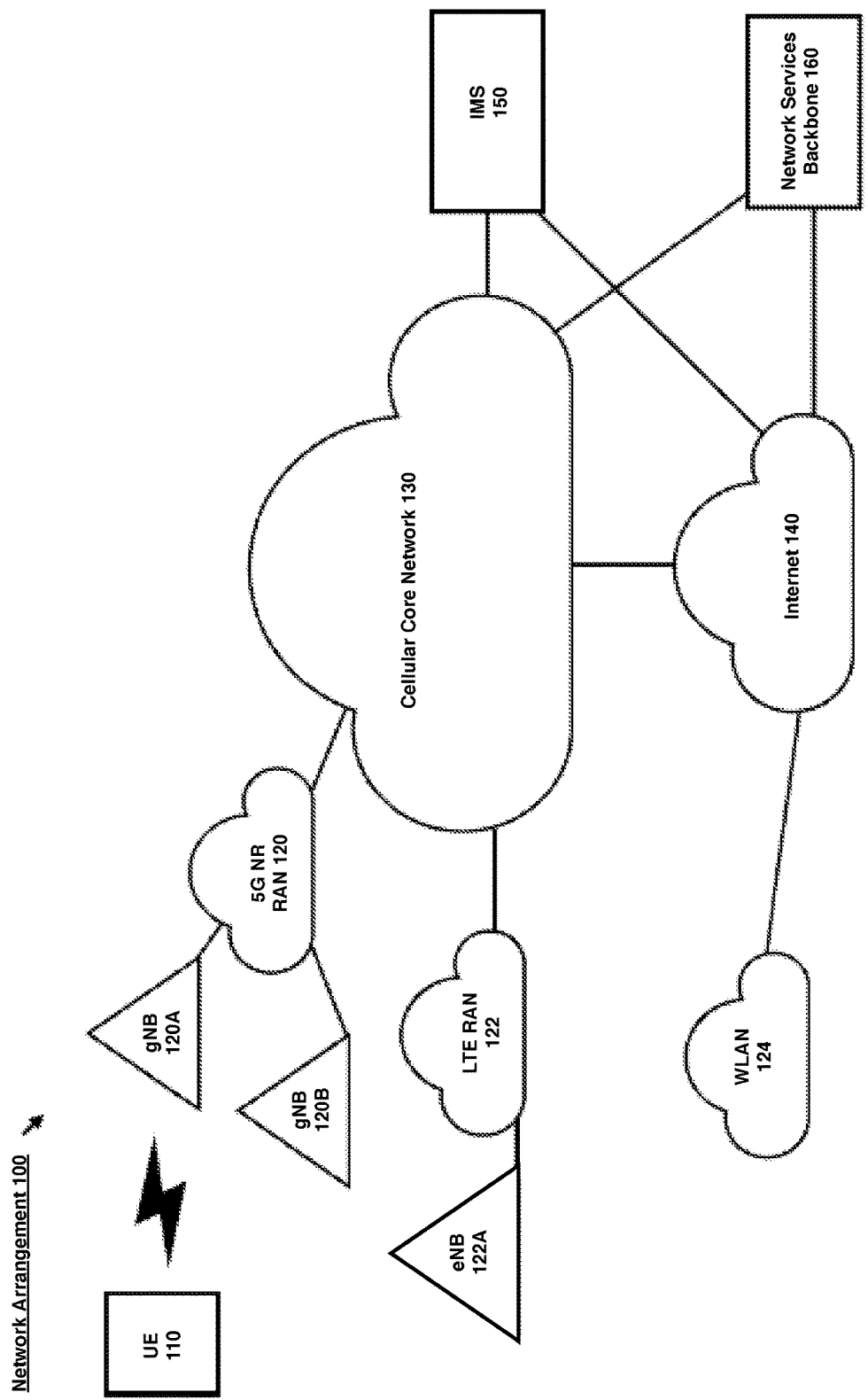
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to the configuration of search spaces when a secondary cell (SCell) is configured to schedule UE operations on a special cell (SpCell) in addition to the SpCell also being configured to schedule its own operations. In the following description, SpCell may refer to a primary cell (PCell) or a primary SCell (PSCell).

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

In addition, the exemplary embodiments are described with regard to a 5G New Radio (NR) network. However, reference to a 5G NR network is merely provided for illustrative purposes. The exemplary embodiments may be utilized with any network that implements the functionalities described herein.

To provide more flexibility to a 5G NR network using dynamic spectrum sharing (DSS) to schedule control data to be transmitted, it has been suggested that in addition to configuring a SpCell (e.g., a 5G cell) to schedule its own transmissions, a SCell (e.g., a 5G cell) also be configured schedule operations on the SpCell. One issue that arises, however, is how the search space(s) (SS) should be configured to facilitate the scheduling of these transmissions on the SpCell by two cells (the SpCell and the SCell).

According to some exemplary embodiments, the network configures one or more search spaces in at least one of the SpCell and the SCell for scheduling the control data transmissions on the SpCell. The network indicates to the UE which search space(s) should be monitored for this scheduling.

Another issue that arises is how a UE should handle the deactivation or dormancy of an SCell when the scheduling of control data transmissions on the SpCell is performed by both the SpCell and the SCell.

According to other exemplary embodiments, the network configures the one or more search spaces for each of the SpCell and the SCell. The network then explicitly or implicitly indicates to the UE which search space the UE should monitor when the SCell is deactivated or dormant.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
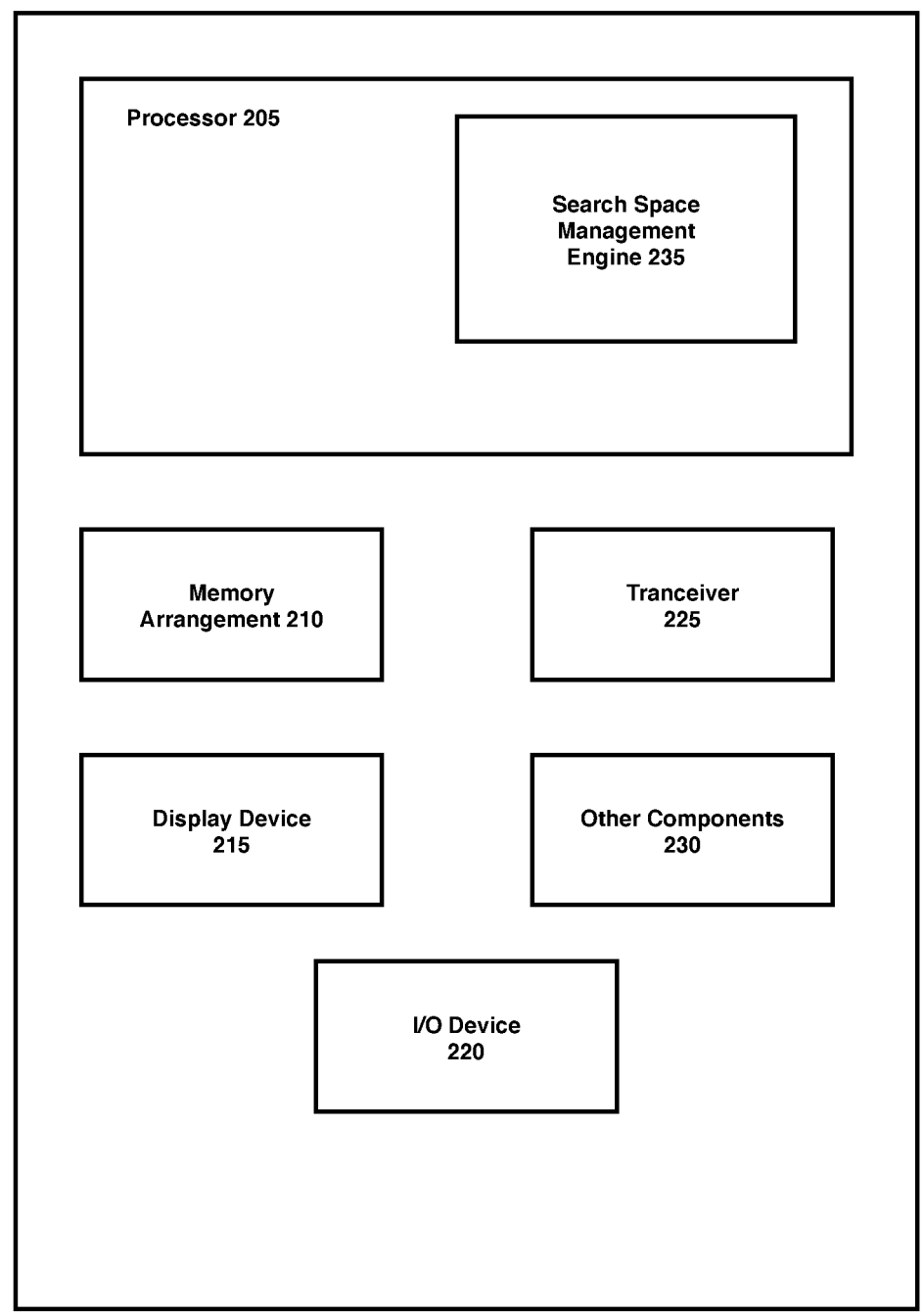
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a search space management engine 235. The search space management engine 235 may perform various operations related to determining which search space(s) should be monitored for control data scheduling for the SpCell, as will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
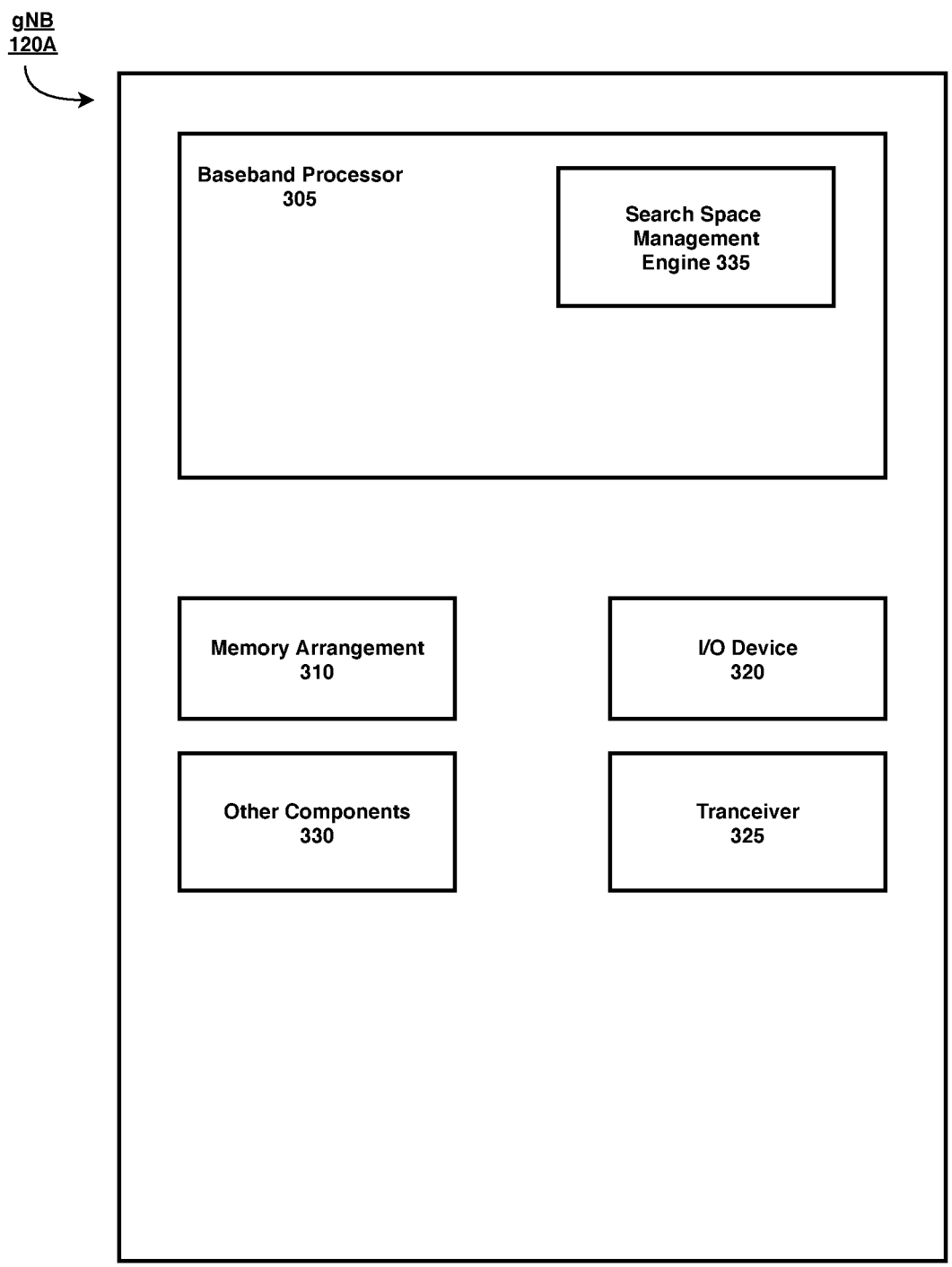
FIG. 3 shows an exemplary base station according to various exemplary embodiments.

FIG. 3 shows an exemplary network base station, in this case gNB 120A, according to various exemplary embodiments. The gNB 120A may represent any access node of the 5G NR network through which the UE 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a search space management engine 335 for performing operations including configuring one or more search spaces when both the SpCell and the SCell are configured to schedule control data transmissions on the SpCell and to configure the UE 110 to handle the deactivation or dormancy of the SCell. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
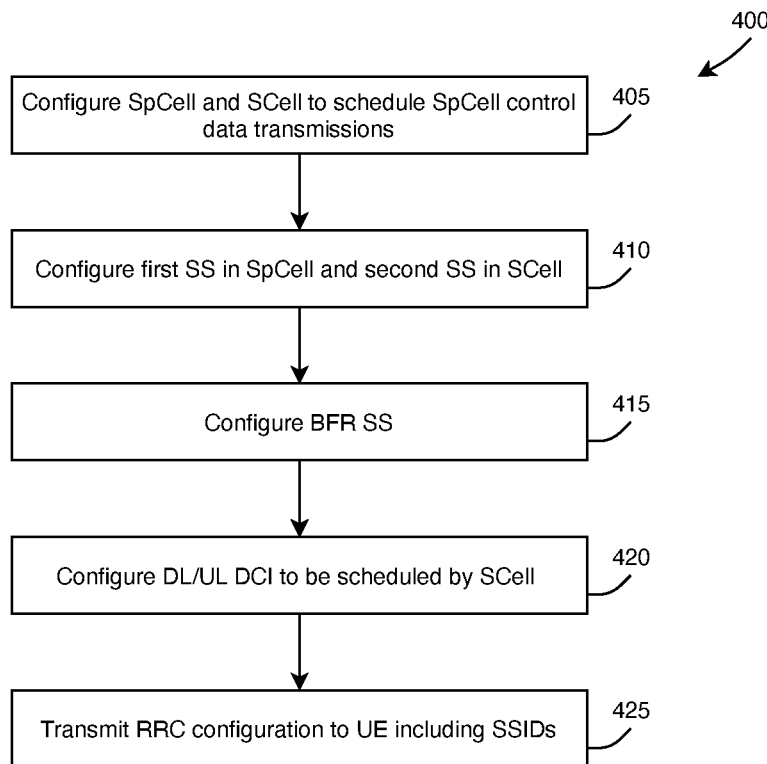
FIG. 4 shows a method of configuring a search space (SS) of a secondary cell (SCell) for scheduling transmissions on a special cell (SpCell) according to various exemplary embodiments.

FIG. 4 shows a method 400 of configuring a search space of a SCell (e.g., a 5G cell) for scheduling transmissions on a SpCell (e.g., a 5G cell) according to various exemplary embodiments. At 405, the gNB 120A (or 120B) configures an SpCell (e.g., gNB 120A) and an SCell (e.g., eNB 122A) to schedule control data transmissions (e.g., DCI, PDCCH, etc.) for the SpCell. In some embodiments, the SCell cannot be configured in frequency range 2 (FR2). In some embodiments, whether or not the SCell can be configured in FR2 depends on the capabilities of the UE. In some embodiments, the SCell cannot be configured in the non-terrestrial network (NTN) spectrum. In some embodiments, the SCell cannot be configured in the NR unlicensed (NR-U) spectrum. In some embodiments, whether or not the SCell can be configured in the NR-U spectrum depends on the capabilities of the UE.

At 410, the gNB 120A configures a first search space in the SpCell and a second search space in the SCell. In some embodiments, the first and second search spaces have the same search space ID (SearchSpaceId). In such an embodiment, the two search spaces are automatically linked because when the gNB 120A configures the UE 110 with the SearchSpaceId to monitor, then that SearchSpaceId corresponds to the first and second search spaces. In some embodiments, when the first and second SearchSpaceIds are the same, the nrofCandidates information element (IE) is in the first search space of the SpCell and all other control signal configurations (e.g., non-fallback DCI, remaining PDCCH configurations) are in the second search space of the SCell. In some embodiments, when the first and second SearchSpaceIds are the same, the nrofCandidates IE and some other control signal configuration (e.g., monitoringSlotPeriodicityAndOffset, monitoringSymbolsWithinSlot, duration) is in the first search space of the SpCell and all other control signal configurations (e.g., non-fallback DCI, remaining PDCCH configurations) are in the second search space of the SCell.

In some embodiments, the first and second search spaces and their corresponding SearchSpaceIds are different. In such an embodiment, the first search space of the SpCell includes fallback DCI scheduling (e.g., Format 0_0 and 1_0) and the second search space includes the scheduling of all other control signaling (e.g., non-fallback DCI, all PDCCH configurations). In such an embodiment, because the SearchSpaceIds of the two search spaces are different, the gNB 120A explicitly indicates the second SSID to the UE 110 so that the UE 110 knows which search space to monitor for the non-fallback DCI and all PDCCH configurations. In some embodiments, the second search space is counted as one of the standard-defined maximum of ten search spaces per cell. In some embodiments, the second search space is alternatively not counted as one of the standard defined maximum of ten search spaces per cell.

At 415, the gNB 120A configures a beam failure recovery (BFR) search space. In some embodiments, the BFR search space (recoverySearchSpaceId) is only configured in the SpCell. In some embodiments, the BFR search space (recoverySearchSpaceId) is only configured in the SCell. In some embodiments, the gNB 120A may choose which cell to configure the BFR search space (recoverySearchSpaceId).

At 420, the gNB 120A configures whether downlink (DL) and/or uplink (UL) DCI transmissions are scheduled by the second search space of the SCell. In some embodiments, both the first search space of the SpCell and the second search space of the SCell schedule DL and UL DCI for UE operations on the SpCell. In some embodiments, the gNB 120A alternatively restricts which DCI (DL or UL) the UE 110 is configured to monitor on the SCell.

At 425, the gNB 120A transmits an RRC configuration to the UE 110 that includes a first SearchSpaceId corresponding to the first search space and a second SearchSpaceId corresponding to the second search space so that the UE 110 knows which search space(s) to monitor for control signals that schedules operations on the SpCell. In some embodiments, the RRC configuration further includes the BFR search space ID.

As currently defined by the Third Generation Partnership (3GPP) standards, the total number of different DCI sizes monitored by the UE 110 is four. The total number of different DCI sizes for DCI transmissions scrambled by cell radio network temporary identifier (C-RNTI) monitored by the UE 110 is three. In some embodiments, the UE 110 is limited to these maximums on both the first and second search spaces. In some embodiments, the UE 110 is alternatively limited to these maximums on each of the first and second search spaces. In such an embodiment, the UE 110 may report to the gNB 120A whether it supports the additional DCI size monitoring limitation associated with applying the size limit on a per cell basis.

Figure 5:
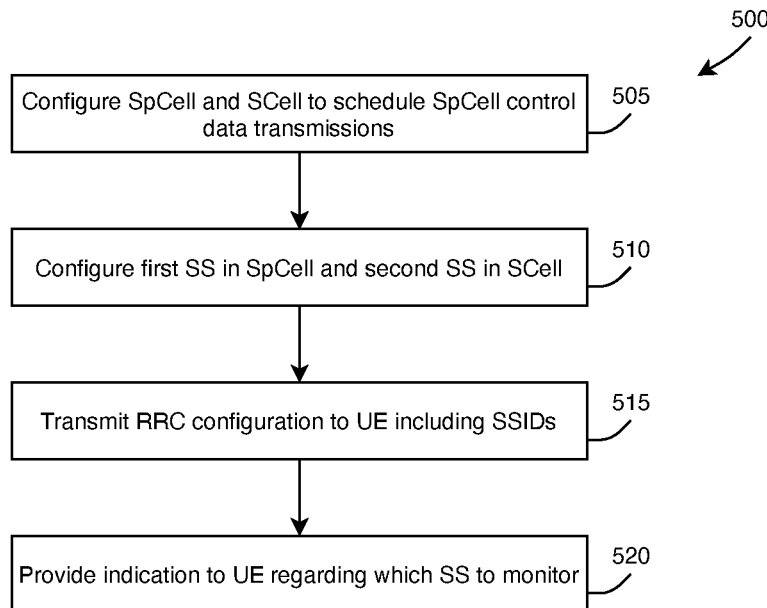
FIG. 5 shows a method of configuring a UE to handle deactivation of an SCell configured to schedule transmissions on a SpCell according to various exemplary embodiments.

FIG. 5 shows a method 500 of configuring a UE 110 to handle deactivation of an SCell configured to schedule transmissions on a SpCell according to various exemplary embodiments. The following description is made with the assumption that the SpCell is a 5G cell and the SCell is a 5G cell.

At 505, the gNB 120A (or 120B) configures an SpCell (e.g., gNB 120A) and an SCell (e.g., eNB 122A) to schedule control data transmissions (e.g., DCI) for the SpCell. At 510, the gNB 120A configures a first search space having a first SearchSpaceId in the SpCell and a second search space having a second SearchSpaceId in the SCell. At 515, the gNB 120A transmits an RRC configuration to the UE 110 including the SearchSpaceIds of the first and second search spaces. At 520, the gNB 120A provides an indication to the UE 110 regarding which search space to monitor (which search space is activated) when the SCell is deactivated or dormant.

In some embodiments, the indication provided by the gNB 120A at 520 is an implicit indication. In such an embodiment, when the UE 110 receives an indication that the SCell has been deactivated or is dormant, the UE 110 implicitly knows that the second search space is deactivated and the first search space is activated. Similarly, when the UE 110 receives an indication that the SCell has been activated, the UE 110 implicitly knows that the second search space is activated and the first search space is deactivated.

In some embodiments, the indication provided by the gNB 120A at 520 may be an explicit indication. In such an embodiment, the gNB 120A may transmit a DCI or a medium access control (MAC) control element (CE) to indicate to the UE 110 which search space the UE 110 should monitor. In some embodiments, the gNB 120A may configure a timer to address a scenario in which the DCI/MAC CE is not received or improperly decoded by the UE 110. The timer begins when the DCI/MAC CE is received. Upon expiration of the timer, the UE 110 begins to monitor a default search space. For example, if the DCI/MAC CE indicates that the UE 110 should monitor the second search space, the UE 110 monitors the second search space until the expiration of the timer, at which point the UE 110 monitors the first search space, which is configured to be the default search space. If the gNB 120A intends for the UE 110 to continue to monitor the second search space, then the gNB 120A sends another DCI/MAC CE indicating that the UE 110 should monitor the second search space. Upon receipt of the second DCI/MAC CE, the timer is reset. In some embodiments, the timer is set to 100 ms. It should be noted that the default search space may be configured to be either of the first or second search spaces.

In some embodiments, the configured SCell at 505 may be a plurality of SCells. In such an embodiment, only one of the plurality of SCells is activated at any given time for monitoring the control signaling that schedules operations on the SpCell. In some embodiments, the activated SCell may be indicated explicitly by the gNB 120A to the UE 110 when an SCell is deactivated or dormant via, for example, a DCI or MAC CE. In some embodiments, the activated SCell may be determined based on a priority based on a plurality of predetermined factors such as, for example, the periodicity of the search space in each SCell that is configured to schedule the control data signaling on the SpCell, the SearchSpaceId of each search space in each SCell that is configured to schedule the control data signaling on the SpCell, and the cell index (ServCellIndex) of each SCell. For example, a search space with a lesser periodicity would have a higher priority than a search space with a greater periodicity.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a base station for a fifth generation (5G) new radio (NR) network using dynamic spectrum sharing (DSS), the base station comprising a cell configured to operate as a secondary cell (SCell), the processor configured to perform operations comprising:
   generating, for transmission, first configuration information indicating the SCell is allowed to schedule control data transmissions on a special cell (SpCell), wherein when the SCell is allowed to schedule the control data transmission on the SpCell, the SCell cannot be configured in frequency range 2 (FR2) of the NR spectrum; and
   generating, for transmission, second configuration information to a user equipment (UE) indicating information related to the SpCell transmitting the control data transmissions.

2. The processor of claim 1, wherein the SCell is not configured in an unlicensed spectrum.

3. The processor of claim 1, wherein the SCell is not configured in a spectrum for non-terrestrial networks (NTNs).

4. The processor of claim 1, wherein the SpCell comprises a primary cell (PCell) or a primary SCell (PSCell).

5. The processor of claim 1, wherein the second configuration information further comprises information related to deactivation or dormancy of the SCell.

6. The processor of claim 1, wherein the control data transmissions comprise Downlink Control Information (DCI) or a Physical Downlink Control Channel (PDCCH).

7. The processor of claim 1, wherein the second configuration information is transmitted to the UE via a radio resource control (RRC) signal.

8. The processor of claim 1, wherein the second configuration information comprises information related to a search space of the SpCell and information related to a search space of the SCell.

9. A base station of a fifth generation (5G) new radio (NR) network configured to use dynamic spectrum sharing (DSS) and operate as a secondary cell (SCell), comprising:

a transceiver configured to communicate with a user equipment (UE); and a processor communicatively coupled to the transceiver and configured to perform operations comprising:

generating, for transmission, first configuration information indicating the SCell is allowed to schedule control data transmissions on a special cell (SpCell), wherein when the SCell is allowed to schedule the control data transmission on the SpCell, the SCell cannot be configured in frequency range 2 (FR2) of the new radio (NR) spectrum; and generating, for transmission, second configuration information to the UE indicating information related to the SpCell transmitting the control data transmissions.

10. The base station of claim 9, wherein the SCell is not configured in an unlicensed spectrum.

11. The base station of claim 9, wherein the SCell is not configured in a spectrum for non-terrestrial networks (NTNs).

12. The base station of claim 9, wherein the SpCell comprises a primary cell (PCell) or a primary SCell (PS-Cell).

13. The base station of claim 9, wherein the second configuration information further comprises information related to deactivation or dormancy of the SCell.

14. The base station of claim 9, wherein the control data transmissions comprise Downlink Control Information (DCI) or a Physical Downlink Control Channel (PDCCH).

15. The base station of claim 9, wherein the second configuration information is transmitted to the UE via a radio resource control (RRC) signal.

16. The base station of claim 9, wherein the second configuration information comprises information related to a search space of the SpCell and information related to a search space of the SCell.

17. A processor of a base station comprising a cell configured to operate as a special cell (SpCell), the processor configured to perform operations comprising:

receiving first configuration information indicating a secondary cell (SCell) of a fifth generation (5G) new radio (NR) network is configured to use dynamic spectrum sharing (DSS) and is allowed to schedule control data transmissions on the SpCell, wherein when the SCell is allowed to schedule the control data transmission on the SpCell, the SCell cannot be configured in frequency range 2 (FR2) of the new radio (NR) spectrum; and receiving, from the SCell, second configuration information indicating scheduling information related to the SpCell transmitting the control data transmissions.

18. The processor of claim 17, wherein the first configuration information indicates the SCell is not configured in frequency range 2 (FR2) of the New Radio (NR) spectrum or an unlicensed spectrum.

* * * * *